United States Patent
Nakayama

(10) Patent No.: US 10,717,186 B1
(45) Date of Patent: Jul. 21, 2020

(54) ROTARY AXIS CABLE WIRING STRUCTURE

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/813,542

(22) Filed: Mar. 9, 2020

Related U.S. Application Data

(63) Continuation of application No. 16/041,156, filed on Jul. 20, 2018, now Pat. No. 10,603,787.

(30) Foreign Application Priority Data

Aug. 3, 2017 (JP) ................................. 2017-150531

(51) Int. Cl.
*B25J 19/00* (2006.01)
*B25J 9/00* (2006.01)
(Continued)

(52) U.S. Cl.
CPC .......... *B25J 9/0009* (2013.01); *B25J 19/0041* (2013.01); *H01R 35/02* (2013.01); *H01R 39/64* (2013.01); *H02G 11/00* (2013.01)

(58) Field of Classification Search
CPC ..... B25J 19/0041; B25J 9/0009; H02G 11/00; H01R 35/02; H01R 39/64
(Continued)

(56) References Cited

U.S. PATENT DOCUMENTS

| 5,375,480 A * | 12/1994 | Nihei | ................... B25J 19/0029 74/490.02 |
|---|---|---|---|
| 2009/0166478 A1 * | 7/2009 | Choi | ................... B25J 19/0025 248/51 |

(Continued)

FOREIGN PATENT DOCUMENTS

| JP | H04-115594 U | 10/1992 |
|---|---|---|
| JP | H05-014767 U | 2/1993 |

(Continued)

OTHER PUBLICATIONS

An Office Action mailed by the Japanese Patent Office dated May 7, 2019, which corresponds to Japanese Patent Application No. 2017-150531 and is related to U.S. Appl. No. 16/041,156; with English translation.

*Primary Examiner* — Sherman Ng
(74) *Attorney, Agent, or Firm* — Studebaker & Brackett PC

(57) ABSTRACT

To provide a rotary axis cable wiring structure and a robot having higher usability at the time of assembly and increased reliability as to whether or not cables are properly disposed. A rotary axis cable wiring structure includes a fixed member and a movable member which are rotatable relatively, a cylindrical hollow pipe member disposed between the fixed member and the movable member so as to be rotatable with respect to the movable member, a plurality of cable bundles passed from one of the fixed member and the movable member to the other through the hollow pipe member, first cable fixing means for fixing the cable bundles to the fixed member, and second cable fixing means for fixing the cable bundles to the movable member. Each of the cable bundles includes a plurality of cables, and a cable bundling member having an outer diameter smaller than an inner diameter of the hollow pipe member and bundling the (Continued)

plurality of cables in a state where mutual relative arrangement is maintained.

7 Claims, 3 Drawing Sheets

(51) Int. Cl.
*H01R 35/02* (2006.01)
*H02G 11/00* (2006.01)
*H01R 39/64* (2006.01)

(58) Field of Classification Search
USPC ........................................................ 174/70 R
See application file for complete search history.

(56) References Cited

U.S. PATENT DOCUMENTS

2009/0255711 A1* 10/2009 Choi .................... B25J 19/0025
174/135
2015/0246449 A1* 9/2015 Sakai .................... B25J 19/0025
74/490.02

FOREIGN PATENT DOCUMENTS

| JP | 2003-305684 A | 10/2003 |
| JP | 2014-065110 A | 4/2014 |
| JP | 2015-168037 A | 9/2015 |

* cited by examiner

ROTARY AXIS CABLE WIRING STRUCTURE

This application is a Continuation of U.S. patent application Ser. No. 16/041,156 filed Jul. 20, 2018, which is based on and claims the benefit of priority from Japanese Patent Application No. 2017-150531, filed on 3 Aug. 2017, the content of which is incorporated herein by reference.

BACKGROUND OF THE INVENTION

Field of the Invention

The present invention relates to a rotary axis cable wiring structure in which a cable is inserted through a cylindrical rotary axis part, and a robot having the rotary axis cable wiring structure.

Related Art

Some conventional industrial robots include a hollow pipe to protect a cable disposed from one to the other of members rotating relatively (refer to, for example, Patent Documents 1 and 2). Such an industrial robot requires more cables passed through the inside in order to deal with vision, sensors and the like.

Patent Document 1: Japanese Unexamined Patent Application, Publication No. 2015-168037

Patent Document 2: Japanese Unexamined Patent Application, Publication No. 2003-305684

SUMMARY OF THE INVENTION

In some cases, a whole cable assembly in which many cables are bundled by a cable clamp is not able to be passed through a hollow pipe together with the cable clamp because the hollow pipe has a small diameter or the filling degree of such cables is high.

The cables need to be fixed after being passed through the hollow pipe. In this case, the cables need to be fixed so as not to intersect (cross) mutually inside the hollow pipe. However, in some cases where the filling degree of such cables in the hollow pipe is high, even checking may be difficult. As a result, problems arise that assembly takes time and that the reliability as to whether or not the cables are disposed properly is low.

An object of the present invention is to provide a rotary axis cable wiring structure and a robot having higher usability at the time of assembly and increased reliability as to whether or not cables are disposed properly.

(1) The rotary axis cable wiring structure (for example, a rotary axis cable wiring structure 2 described below) according to the present invention includes a first member (for example, a fixed member 3 described below) and a second member (for example, a movable member 4 described below) rotatable respectively, a cylindrical rotary axis part (for example, a hollow pipe member 5 described below) disposed between the first member and the second member so as to be rotatable with respect to at least one of the first member and the second member, one or a plurality of cable bundles (for example, cable bundles 6 described below) passed from one of the first member and the second member to the other through the rotary axis part, first cable fixing means (for example, first cable fixing means 7 described below) for fixing the cable bundles to the first member, and second cable fixing means (for example, second cable fixing means 8 described below) for fixing the cable bundles to the second member. Each of the cable bundles includes a plurality of cables (for example, cables 60 described below), and a cable bundling member (for example, a cable bundling member 61 described below) having an outer diameter smaller than an inner diameter of the rotary axis part and bundling the plurality of cables in a state where mutual relative arrangement is maintained.

(2) In the rotary axis cable wiring structure according to (1), with respect to each of the cables, a length (for example, a length L1 described below) from a portion bundled by the cable bundling member to a connector (for example, a connector 60a described below) provided at an end portion may be longer than a length (for example, a length L2 described below) of the rotary axis part in an axial direction.

(3) In the rotary axis cable wiring structure according to (1) or (2), each of the cable bundles may include two of the cable bundling members at spaced positions, and the plurality of cables may be disposed mutually in parallel in a section interposed between the cable bundling members in a predetermined state of the first member and the second member not rotated relatively.

(4) In the rotary axis cable wiring structure according to any one of (1) to (3), the predetermined state of the first member and the second member not rotated relatively may correspond to a state of the rotary axis part positioned at a reference angle, and the rotary axis part may have allowable maximum twisting angles equal in both normal and reverse rotating directions from the reference angle.

(5) In the rotary axis cable wiring structure according to any one of (1) to (4), each of the cable bundles may be a cable kit fixed in advance to one of the first cable fixing means and the second cable fixing means.

(6) In the rotary axis cable wiring structure according to any one of (1) to (5), the same member may serve as each of the cable bundling members.

(7) In the rotary axis cable wiring structure according to any one of (1) to (6), the cable bundling member may be a plate member having a substantially same width as a width of each of the cable bundles, and may have a structure capable of being fixed by a bolt to the first cable fixing means or the second cable fixing means.

(8) In the rotary axis cable wiring structure of any one of (1) to (6), the cable bundling member may be a tape member.

(9) The rotary axis cable wiring structure according to any one of (1) to (8) may further include means for identifying the cables.

(10) The robot (for example, a robot 1 described below) according to the present invention includes the rotary axis cable wiring structure according to any one of (1) to (9).

The present invention is able to provide a rotary axis cable wiring structure and a robot having higher usability at the time of assembly and increased reliability as to whether or not cables are disposed properly.

DETAILED DESCRIPTION OF THE INVENTION

One embodiment of the present invention will be described below in detail with reference to FIG. 1 and FIG.

2. FIG. 1 is a schematic diagram illustrating a rotary axis cable wiring structure 2 of a robot 1. FIG. 2 is a schematic diagram illustrating a cable bundle 6 constituting the rotary axis cable wiring structure 2 shown in FIG. 1.

Figure 1:
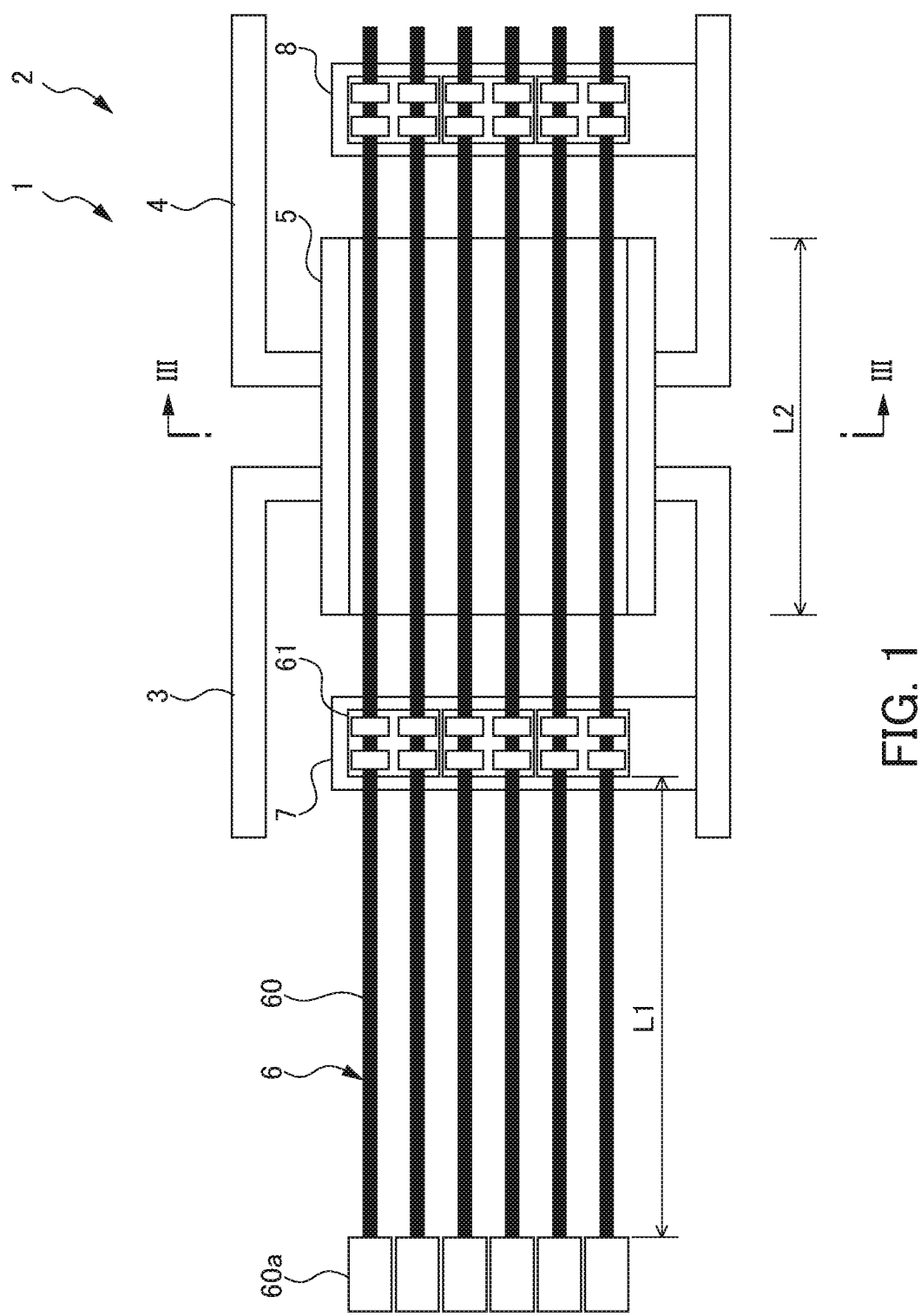
FIG. 1 is a schematic diagram illustrating a rotary axis cable wiring structure of a robot according to one embodiment of the present invention.
Figure 2:
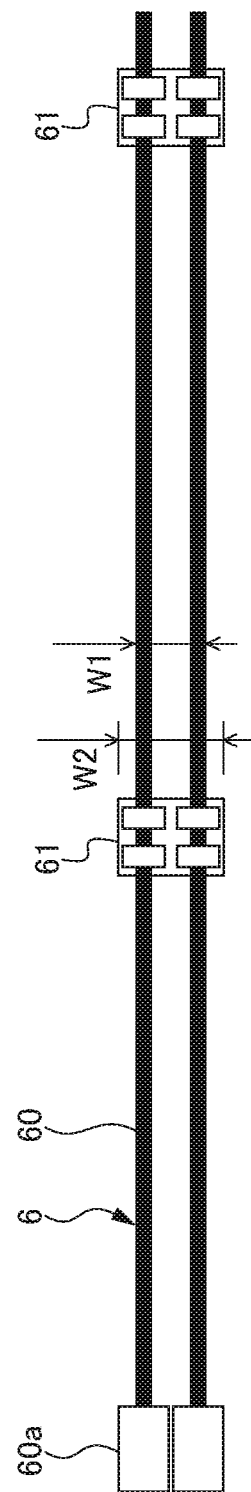
FIG. 2 is a schematic diagram illustrating a cable bundle constituting the rotary axis cable wiring structure shown in FIG. 1.

As shown in FIG. 1, the rotary axis cable wiring structure 2 of the robot 1 is configured to protect a plurality of cables 60 disposed from one to the other of members 3, 4 rotating relatively, so as to prevent damage such as disconnection caused by torsion (twisting).

Specifically, the rotary axis cable wiring structure 2 includes a fixed member (first member) 3, a movable member (second member) 4, a hollow pipe member (rotary axis part) 5, a plurality of the cable bundles 6, first cable fixing means 7, and second cable fixing means 8.

The fixed member 3, which is a member having an internal space, supports and fixes one end of the hollow pipe member 5 so as to communicate with the hollow pipe member 5. In the fixed member 3, the first cable fixing means 7 fixes the cables 60 passed through the hollow pipe member 5 from the movable member 4.

The movable member 4, which is a member having an internal space, rotatably supports the other end of the hollow pipe member 5 so as to communicate with the hollow pipe member 5. In the movable member 4, the second cable fixing means 8 fixes the cables 60 passed through the hollow pipe member 5 to the fixed member 3.

The hollow pipe member 5, which is a cylindrical member constituting a wrist of the robot 1, communicates with the fixed member 3 so that the one end of the hollow pipe member 5 is supported and fixed to the fixed member 3, and also communicates with the movable member 4 so that the other end of the hollow pipe member 5 is rotatably supported by the movable member 4.

The cable bundles 6 are passed from the movable member 4 through the hollow pipe member 5 to the fixed member 3. As shown in FIG. 1 and FIG. 2, each of the cable bundles 6 includes the plurality of cables 60 and two cable bundling members 61.

Each of the plurality of cables 60 has a connector 60a at the end portion thereof. The plurality of cables 60 are bundled by the two cable bundling members 61 in a state in which the mutual relative arrangement of the cable bundling members 61 is maintained. A length L1, which is the length from the portion bundled by the cable bundling member 61 closer to the connector 60a to the connector 60a provided at the end portion, is longer than a length L2 of the hollow pipe member 5 in the axial direction. The plurality of cables 60 are disposed mutually in parallel in the section interposed between the cable bundling members 61, in a predetermined state (initial reference state) in which the fixed member 3 and the movable member 4 are not rotated relatively.

The plurality of cables 60 are configured so that the angle in one direction by which the cables are twisted maximally is equal to the angle in the other direction by which the cables are twisted maximally. Therefore, with respect to the fixed member 3 and the movable member 4, the angle in one direction by which the fixed member 3 and the movable member 4 are rotatable from the initial state in which the fixed member 3 and the movable member 4 are not rotated relatively is equal to the angle in the other direction by which the fixed member 3 and the movable member 4 are rotatable from the initial state. Accordingly, the predetermined state (the initial reference state) in which the fixed member 3 and the movable member 4 are not rotated relatively means the state in which the hollow pipe member 5 is positioned at a reference angle. In this case, the hollow pipe member 5 has the allowable maximum twisting angles equal in both normal and reverse rotating directions from the reference angle.

The two cable bundling members 61 bundle the plurality of cables 60 at spaced positions in a state in which the mutual relative arrangement of the cable bundling members 61 is maintained. The cable bundling members 61, each of which has an outer diameter smaller than the hollow pipe member 5, are able to be passed through the hollow pipe member 5. Specifically, each of the cable bundling members 61 is a plate member having a width W2 which is slightly larger than a width W1 of the cable bundle 6 and substantially equal to the width W1 of the cable bundle 6, and has a structure capable of being fixed by a bolt to the first cable fixing means 7 or the second cable fixing means 8. The same member serves as each of the plurality of cable bundling members 61 constituting each of the cable bundles 6.

Each of the cable bundles 6 is a cable kit fixed in advance to the second cable fixing means 8 corresponding to the one which is positioned closer to the base end portion of the cable bundles 6 (positioned in the opposite side to the connector 60a) in the first cable fixing means 7 and the second cable fixing means 8. That is, the cable bundling member 61 is fixed in advance to the second cable fixing means 8, and the cable bundling member 61 is to be fixed to the first cable fixing means 7 in a subsequent operation. In this case, the first cable fixing means 7 and the second cable fixing means 8 need to have a structure that is detachable from the fixed member 3 and the movable member 4, respectively.

A description is given with reference to FIG. 1 again. The first cable fixing means 7, which is provided inside the fixed member 3, is subjected to fixing of the cable bundling member 61 with a bolt, thereby fixing all of the cable bundles 6 to the fixed member 3. That is, the first cable fixing means 7 fixes the cables 60 in the vicinity of the hollow pipe member 5, so that, when the fixed member 3 and the movable member 4 are rotated relatively, the cables 60 do not move relatively to the first cable fixing means 7 in the longitudinal direction of the cables 60 or in the rotation direction of the cables 60 being twisted.

The second cable fixing means 8, which is provided inside the movable member 4, is subjected to fixing of the cable bundling member 61 with a bolt, thereby fixing all of the cable bundles 6 to the movable member 4. That is, the second cable fixing means 8 fixes the cables 60 in the vicinity of the hollow pipe member 5, so that, when the fixed member 3 and the movable member 4 are rotated relatively, the cables 60 do not move relatively to the second cable fixing means 8 in the longitudinal direction of the cables 60 or in the rotation direction of the cables 60 being twisted.

Figure 3:
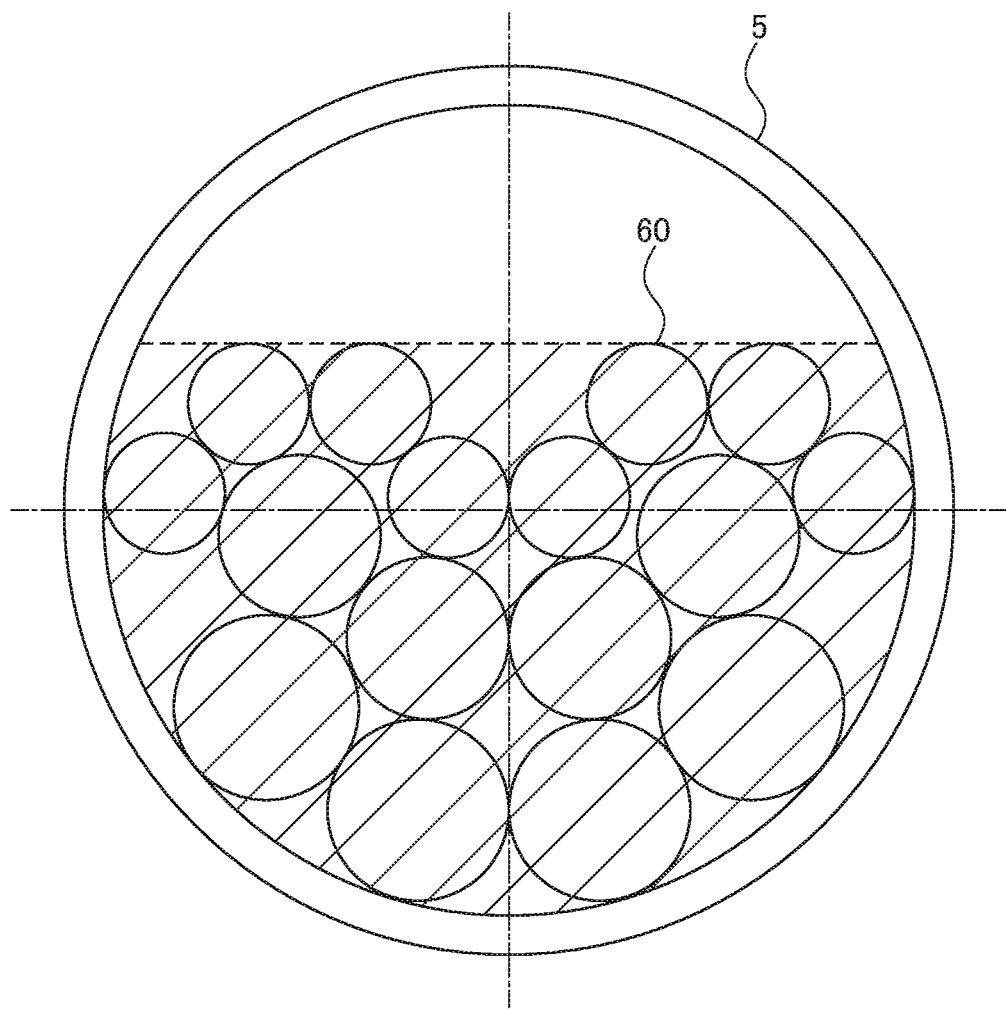
FIG. 3 is a cross-sectional view of the rotary axis cable wiring structure cut along a line shown in FIG. 1.

One example of the inside of the hollow pipe member 5 is described below with reference to FIG. 3. FIG. 3 is a cross-sectional view of the cable arrangement 2 cut along a line shown in FIG. 1.

As shown in FIG. 3, the plurality of cables 60 are disposed inside the hollow pipe member 5. In the case where the hollow pipe member 5, which has a hollow hole diameter (internal diameter) of 40 mm, houses four of the cables 60 each having a diameter of 9 mm, four of the cables 60 each having a diameter of 8 mm, and four of the cables 60 each having a diameter of 6 mm, a ratio of the total cross-sectional area of the cables 60 to the cross-sectional area of the hollow hole is 54.3%. It is noted that gaps are formed among the cables 60, and thus the ratio of the portion occupied by the cables 60 (the portion shown with hatching) to the cross-sectional area of the hollow hole (hollow hole occupancy ratio) is 75.7%.

As described above, even when the occupancy ratio (filling degree) of the cables in the hollow pipe member 5 is high, the rotary axis cable wiring structure 2 of the robot 1 according to the present embodiment is able to provide higher usability at the time of assembly and increased reliability as to whether or not the cables 60 are disposed properly.

Even in the case where the hollow hole occupancy ratio in the cross-sectional area of the hollow hole is high, the plurality of cables 60 are passed through the hollow pipe member 5 so that the plurality of cables 60 do not cross inside the hollow pipe member 5, and order in arrangement is ensured at the time of assembly even without checking in detail the arrangement of the many cables 60, whereby the usability is high and the reliability is also increased.

Since the length L1 of the cables 60 from the portion bundled by the cable bundling member 61 to the connector 60a provided at the end portion is longer than the length L2 of the hollow pipe member 5 in the axial direction, the connectors 60a having a larger thickness than each of the cables 60 is able to be passed through the hollow pipe member 5 one by one. The connectors 60a are passed through the hollow pipe member 5, enabling the passing of the cable bundle 6 through the hollow pipe member 5, whereby the usability is further improved.

The cable bundling member 61 is provided also to the side of the cable bundle 6 not passed through the hollow pipe member 5 (the side of the movable member 4), whereby the positional relation between the two cable bundling members 61 is defined and thus the usability is further improved.

The hollow pipe member 5 has a certain reference angle (for example, 0°) and specifications adaptive to twisting by the maximum angles equal in the clockwise direction and in the counterclockwise direction from the reference angle. The hollow pipe member 5 is configured so that the fixed member 3 and the movable member 4 are not rotated relatively when the hollow pipe member 5 is positioned at the reference angle. This provides such a structure that the cables 60 are able to be wired mutually in parallel under a state where the minimum stress acts on the cables 60, and that the maximum stress acts on the cables 60 at the maximum angles equal in the clockwise direction and in the counterclockwise direction, thereby enabling the realization of longer lives in the cables 60.

Since each of the cable bundles 6 is a cable kit fixed in advance to the second cable fixing means 8 corresponding to the one which is positioned closer to the base end portion of the cable bundle 6 (positioned in the opposite side to the connector 60a) in the first cable fixing means 7 and the second cable fixing means 8, the positional relation among the cables 60 of all of the cable bundles 6 is defined and thus the usability is further improved.

The same member serves as each of the cable bundling members 61 of each of the cable bundles 6, thereby enabling reduction in cost and prevention of errors in assembling components.

A simple and unbulky plate member serves as each of the cable bundling members 61, thereby enabling further improvement in usability and reduction in cost.

Although the embodiment of the present invention has been described above, the present invention is not limited to the above-described embodiment. The most preferable effects produced by the present invention have been merely listed as the effects in the present embodiment, and the effects according to the present invention are not limited to those described in the present embodiment.

Although the case where the fixed member 3 fixed to the hollow pipe member 5 and the movable member 4 rotatable with respect to the hollow pipe member 5 are included as the relatively rotatable members has been described in the above embodiment, the present invention is not limited to the above case. In the present invention, another member rotatable with respect to the hollow pipe member 5, instead of the fixed member 3, may be included as a relatively rotatable member.

Although the case where the plurality of cable bundles 6 are included has been described in the above embodiment, the present invention is not limited to the case above. In the present invention, another case may be applicable, where one cable bundle 6 is included.

Although the case where the plurality of cables 60 are bundled by the cable bundling members 61 each of which is a plate member has been described in the above embodiment, the present invention is not limited to the above case. In the present invention, another case may be applicable, where the plurality of cables 60 are bundled by a cable bundling member which is a tape member, instead of the cable bundling member 61 or in addition to the cable bundling member 61. The cable bundling member, which is a tape member, may wind around a portion further separated from the hollow pipe member 5 than the first cable fixing means 7 or the second cable fixing means 8, or may directly wind around the portion of the plurality of cables 60 to be fixed on the first cable fixing means 7 or the second cable fixing means 8. In other words, it is necessary to wind and fix the non-movable portions of the cables 60. If the movable region is fixed, the cables 60 are restrained in movement, which may result in early disconnection of the cables 60.

In the above-described embodiment, means for identifying the cables 60 may be provided in the vicinity of the cable bundling member 61. The plurality of cables 60 are passed through as the cable bundle 6 at the time of assembly, and thus the positional relation of the cables 60 may not be known. Provision of the means for identifying the cables 60 solves such a problem.

Alternatively, the cable 60 may be configured with a plurality of cables, for example, four cables including two cables in the longitudinal direction of the cable bundling member 61 and two cables in the thickness (height) direction of the cable bundling member 61. In such a case, the cable bundling member 61 is able to be checked as to whether each of the four cables constituting the cable 60 is positioned at the same phase in the direction of rotation (twisting of the cable 60) with respect to the two cable bundling members 61, thereby preventing the cable 60 from being disposed in a slightly twisted state in the section interposed between the two cable bundling members 61. In this case, there is a possibility that twisting by one turn (360°) may not be identified. However, it is not easy to fix to the cable bundling members 61 the cable 60 intentionally twisted by one turn in such a short section. Therefore, there is no problem as long as slight twisting is able to be prevented.

Although the hollow pipe member 5 in the above-described embodiment is configured to be rotatable with respect to at least one of the fixed member 3 and the movable member 4 such that one end thereof is supported by the fixed member 3 and the other end is supported by the movable member 4, the invention is not limited to the above configuration. In an example, the hollow pipe member 5 may be integrated with the fixed member 3 or the movable member 4.

In the above-described embodiment, the first cable fixing means 7 fixes all of the cable bundles 6 to the fixed member 3. Alternatively, the first cable fixing means 7 may fix some of the cable bundles 6 to the fixed member 3. The second cable fixing means 8 fixes all of the cable bundles 6 to the movable member 4. Similarly, the second cable fixing means 8 may fix some of the cable bundles 6 to the movable member 4. That is, some of the cables 6 not fixed to the inside of the hollow pipe member 5 may be passed through an appropriate portion.

Although each of the cable bundles 6 in the above-described embodiment is a cable kit fixed in advance to the second cable fixing means 8 corresponding to the one which is positioned closer to the base end portion of the cable bundle 6 (positioned in the opposite side to the connector 60*a*) in the first cable fixing means 7 and the second cable fixing means 8, the invention is not limited to the above configuration. The cable bundle 6 may be fixed in advance to one of the first cable fixing means 7 and the second cable fixing means 8.

EXPLANATION OF REFERENCE NUMERALS

1 ROBOT
2 ROTARY AXIS CABLE WIRING STRUCTURE
3 FIXED MEMBER (FIRST MEMBER)
4 MOVABLE MEMBER (SECOND MEMBER)
5 HOLLOW PIPE MEMBER (ROTARY AXIS PART)
6 CABLE BUNDLE
60 CABLE
60*a* CONNECTOR
61 CABLE BUNDLING MEMBER
7 FIRST CABLE FIXING MEANS
8 SECOND CABLE FIXING MEANS

What is claimed is:

1. A cable wiring method of a rotating axis cable wiring structure,
    wherein the rotary axis cable wiring structure comprising:
    a first member and a second member rotatable relatively;
    a cylindrical rotary axis part disposed between the first member and the second member so as to be rotatable with respect to at least one of the first member and the second member;
    one or a plurality of cable bundles having a plurality of cables and a cable bundling member bundling the plurality of cables in a state where mutual relative arrangement is maintained;
    first cable fixing means for fixing the cable bundles to the first member; and
    second cable fixing means for fixing the cable bundles to the second member,
    wherein the cable wiring method including:
    a step of fixing the cable bundling member to the first cable fixing means in a state where the cable bundling member is passed through the inside of the cylindrical rotary axis part.

2. The cable wiring method of a rotating axis cable wiring structure according to claim 1, wherein
    the rotary axis cable wiring structure further comprising a connector provided at an end portion of the cable bundles, and
    wherein the step, in the course of its execution, the cable bundling member at a portion close to the connector is fixed to the first cable fixing means in a state where the cable bundling member at a portion close to the connector is passed through the cylindrical rotary axis part.

3. The cable wiring method of a rotating axis cable wiring structure according to claim 2, further comprising a step of preparing the cable bundles of which length from the portion bundled by the cable bundling member to the connector is longer than the axial length of cylindrical rotary axis part.

4. The cable wiring method of a rotating axis cable wiring structure according to claim 1, further comprising a step of fixing the cable bundling member at a portion thereof which is not passed through the inside of the cylindrical rotary axis part to the second cable fixing means.

5. The cable wiring method of a rotating axis cable wiring structure according to claim 1, further comprising a step of preparing the cable bundles which are formed as a cable kit fixed in advance to one of the first and the second cable fixing means positioned more closer to the base end portion of the cable bundle.

6. The cable wiring method of a rotating axis cable wiring structure according to claim 1, further comprising a step of preparing the cable bundles in which the same member serves as each of the plurality of cable bundling members.

7. A method for manufacturing a robot, to which the cable wiring method according to claim 1 is applied.

* * * * *